US010717850B2

(12) United States Patent
Takeyama

(10) Patent No.: US 10,717,850 B2
(45) Date of Patent: Jul. 21, 2020

(54) COMPOSITION FOR GAS SEAL MEMBER AND GAS SEAL MEMBER

(71) Applicant: ZEON CORPORATION, Chiyoda-ku, Tokyo (JP)

(72) Inventor: Yoshihisa Takeyama, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/736,915

(22) PCT Filed: Jun. 24, 2016

(86) PCT No.: PCT/JP2016/003071
§ 371 (c)(1),
(2) Date: Dec. 15, 2017

(87) PCT Pub. No.: WO2016/208203
PCT Pub. Date: Dec. 29, 2016

(65) Prior Publication Data
US 2018/0362734 A1    Dec. 20, 2018

(30) Foreign Application Priority Data
Jun. 26, 2015  (JP) .................................. 2015-128773

(51) Int. Cl.
| B32B 9/00 | (2006.01) |
| C08K 7/06 | (2006.01) |
| C08K 3/04 | (2006.01) |
| F16J 15/10 | (2006.01) |
| C09K 3/10 | (2006.01) |
| C08L 21/00 | (2006.01) |
| F17C 13/00 | (2006.01) |
| F17C 13/06 | (2006.01) |
| B82Y 30/00 | (2011.01) |

(52) U.S. Cl.
CPC ............... *C08K 7/06* (2013.01); *C08K 3/041* (2017.05); *C08L 21/00* (2013.01); *C09K 3/10* (2013.01); *C09K 3/1009* (2013.01); *C09K 3/1028* (2013.01); *F16J 15/102* (2013.01); *F16J 15/104* (2013.01); *F17C 13/002* (2013.01); *F17C 13/06* (2013.01); *B82Y 30/00* (2013.01); *C09K 2003/1068* (2013.01); *F17C 2221/012* (2013.01); *F17C 2221/033* (2013.01); *F17C 2223/036* (2013.01); *F17C 2270/0168* (2013.01); *F17C 2270/0184* (2013.01); *Y10T 428/30* (2015.01)

(58) Field of Classification Search
CPC ........ C01B 31/04; Y10T 428/30; B82Y 30/00
USPC ........................................... 428/408; 423/448
See application file for complete search history.

(56) References Cited

U.S. PATENT DOCUMENTS

| 7,854,991 B2* | 12/2010 | Hata ..................... B82Y 30/00 |
| | | 423/445 B |
| 2006/0057388 A1* | 3/2006 | Jin ............................ B82B 3/00 |
| | | 428/408 |
| 2008/0318049 A1 | 12/2008 | Hata et al. |
| 2012/0080101 A1 | 4/2012 | Tatarek |
| 2012/0137764 A1* | 6/2012 | Lawrence ............. E21B 49/005 |
| | | 73/152.23 |
| 2013/0261246 A1 | 10/2013 | Ong et al. |
| 2014/0154454 A1 | 6/2014 | Ueki et al. |
| 2014/0353556 A1 | 12/2014 | Shigeta et al. |
| 2015/0123043 A1 | 5/2015 | Nagamune et al. |

FOREIGN PATENT DOCUMENTS

| CN | 101613495 A | 12/2009 |
| CN | 103080861 A | 5/2013 |
| CN | 104302707 A | 1/2015 |
| JP | 2004308836 A | 11/2004 |
| JP | 2008266577 A | 11/2008 |
| JP | 2010001475 A | 1/2010 |
| JP | 2012224815 A | 11/2012 |
| JP | 2013023575 A | 2/2013 |
| JP | 2014109020 A | 6/2014 |
| WO | 2006011655 A1 | 2/2006 |
| WO | 2009155728 A1 | 12/2009 |

OTHER PUBLICATIONS

Oct. 29, 2018, the Extended European Search Report issued by the European Patent Office in the corresponding European Patent Application No. 16813975.6.
Aug. 2, 2016, Written Opinion of the International Searching Authority issued in the International Patent Application No. PCT/JP2016/003071.
Dec. 26, 2017, International Preliminary Report on Patentability issued in the International Patent Application No. PCT/JP2016/003071.

* cited by examiner

*Primary Examiner* — Daniel H Miller
(74) *Attorney, Agent, or Firm* — Kenja IP Law PC

(57) ABSTRACT

Provided is a composition for a gas seal member that can form a gas seal member capable of sufficiently suppressing both the occurrence of overflow fracture and the occurrence of blister fracture. The disclosed composition for a gas seal member is a composition for a gas seal member that contains an elastomer and a fibrous carbon nanostructure. The fibrous carbon nanostructure includes single-walled carbon nanotubes and the fibrous carbon nanostructure is contained in a proportion of at least 0.1 parts by mass and no greater than 12 parts by mass per 100 parts by mass of elastomer.

8 Claims, No Drawings

COMPOSITION FOR GAS SEAL MEMBER AND GAS SEAL MEMBER

TECHNICAL FIELD

This disclosure relates to a composition for a gas seal member and a gas seal member.

BACKGROUND

Gas seal members such as packing and gaskets are conventionally used as members for preventing air leakage. Such gas seal members are then used, for example, for apparatuses that mine underground resources such as petroleum and natural gas at great depth or for hydrogen stations for fuel cell vehicles. In such applications, gas sealing members will be exposed to a harsh environment such as a high temperature environment or the like. Thus, a higher durability in a high temperature environment is required for gas seal members.

For example, in PTL1, a gas seal member that is durable under harsh conditions such as a high temperature environment or the like over a long period of time is provided by forming a gas seal member through crosslinking of an elastomer composition that is obtained by blending multi-walled carbon nanotubes having a specific average diameter relative to a three-dimensional fluorine-containing elastomer in a predetermined proportion.

CITATION LIST

Patent Literature

PTL 1: JP2014-109020 A

SUMMARY

Technical Problem

Durability under a high-pressure environment such as at least 10 MPa is required for gas seal members used for apparatuses for mining underground resources such as petroleum and natural gas at great depth and for hydrogen stations (high-pressure hydrogen) for fuel cell vehicles. Overflow fracture and blister fracture may occur in a gas seal member in contact with such high-pressure gas, and thus occurrence of such fractures are needed to be suppressed.

The "overflow fracture" is a fracture caused by a gas seal member which overflows from a specific attachment position (e.g. a groove) by contact with the high-pressure gas and is bitten by a gap or the like around the position to which the gas seal member is attached. Further, the "blister fracture" is a fracture caused by bursting of the gas seal member when the gas which penetrates into a gas seal member by contact with the high-pressure expands while remaining in the gas seal member at the time of rapid pressure reduction or the like.

However, although the gas seal member described in PTL 1 has an excellent durability in a high temperature environment, its durability under high-pressure conditions is not good enough, and thus the gas seal member cannot be regarded as satisfactory to suppress occurrence of overflow fracture and blister fracture.

Accordingly, an objective of the present disclosure is to provide a composition for a gas seal member that can form a gas seal member capable of suppressing both the occurrence of overflow fracture and the occurrence of blister fracture.

Further, an objective of the present disclosure is to provide a gas seal member capable of sufficiently suppressing both the occurrence of overflow fracture and the occurrence of blister fracture.

Solution to Problem

The inventor conducted diligent investigation in order to achieve the objectives described above. The inventor then discovered that both the occurrence of overflow fracture and the occurrence of blister fracture can be sufficiently suppressed by forming a gas seal member by using a composition that contains a fibrous carbon nanostructure including single-walled carbon nanotubes in a predetermined proportion relative to the elastomer. This discovery led to the present disclosure.

It would therefore be helpful to advantageously solve the above described problem, and the disclosed composition for a gas seal member is a composition for a gas seal member containing an elastomer and a fibrous carbon nanostructure, and the fibrous carbon nanostructure includes single-walled carbon nanotubes, and at least 0.1 parts by mass and no greater than 12 parts by mass of the fibrous carbon nanostructure is contained per 100 parts by mass of the elastomer. In this manner, when a fibrous carbon nanostructure including single-walled carbon nanotubes is contained in a predetermined proportion, a gas seal member capable of sufficiently suppressing both the occurrence of overflow fracture and the occurrence of blister fracture can be formed.

In the disclosed composition for a gas seal member, preferably, the fibrous carbon nanostructure exhibits a convex upward shape in a t-plot obtained from an adsorption isotherm. By using a fibrous carbon nanostructure that exhibits a convex upward shape in a t-plot obtained from an adsorption isotherm, a gas seal member capable of further suppressing the occurrence of blister fracture can be formed.

Preferably, the t-plot has a bending point in a range of $0.2 \leq t(nm) \leq 1.5$. By using a fibrous carbon nanostructure having the bending point of t-plot in the range of $0.2 \leq t(nm) \leq 1.5$, the occurrence of blister fracture can be further suppressed.

Further, preferably, the total specific surface area S1 and the internal specific surface area S2 obtained from the t-plot satisfy $0.05 \leq S2/S1 \leq 0.30$. By using a fibrous carbon nanostructure having a specific surface area S1 and an internal specific surface area S2 that satisfy $0.05 \leq S2/S1 \leq 0.30$, the occurrence of blister fracture can be further suppressed.

Moreover, in the disclosed composition for a gas seal member, preferably, the average diameter of the fibrous carbon nanostructure is at least 2 nm and no greater than 10 nm. By using the fibrous carbon nanostructure having an average diameter of at least 2 nm and no greater than 10 nm, the occurrence of overflow fracture and the occurrence of blister fracture can be further suppressed.

The disclosed composition for a gas seal member may then further contain a crosslinking agent.

Further, the present disclosure aims to advantageously solve the above described problem, and the disclosed gas seal member is formed by using either one of the above described compositions for a gas seal member. The gas seal member formed by using the above described compositions for a gas seal member can sufficiently suppress both the occurrence of overflow fracture and the occurrence of blister fracture.

The above disclosed gas seal member may then be used while being in contact with high pressure gas of at least 10 MPa.

Further, the disclosed high-pressure gas equipment may include a container filled with high pressure gas of at least 10 MPa and a gas seal member being in contact with the high-pressure gas filled in the container. By using the above described gas seal member, a sufficient durability can be obtained even if the gas seal member is in contact with high pressure gas of at least 10 MPa.

The pressure of high-pressure gas may be at least 30 MPa, at least 50 MPa or at least 70 MPa, for example. Further, the pressure of high-pressure gas may be no greater than 120 MPa, no greater than 100 MPa or no greater than 90 MPa, for example. Further, examples of high-pressure gas include, for example, a hydrocarbon such as methane, carbon dioxide, hydrogen and mixed gas of these gases.

Advantageous Effect

According to the present disclosure, a composition for a gas seal member capable of sufficiently suppressing both the occurrence of overflow fracture and the occurrence of blister fracture can be provided.

Further, according to the present disclosure, a gas seal member capable of sufficiently suppressing both the occurrence of overflow fracture and the occurrence of blister fracture can be provided.

DETAILED DESCRIPTION

Embodiments of the present disclosure will now be described below.

The disclosed composition for a gas seal member is used to form a gas seal member such as packing and gasket. Further, the disclosed gas seal member can be formed by using the disclosed composition for a gas seal member, and can be used as a member for preventing gas leakage in an apparatus for mining underground resources such as petroleum and natural gas at great depth and for a hydrogen station for fuel cell vehicles. In particular, the disclosed gas seal member can preferably be used in high-pressure gas equipment in which a gas seal member comes in contact with high pressure gas of at least 10 MPa. Examples of such high-pressure gas equipment include, for example, high-pressure gas equipment including a container filled with high pressure gas of at least 10 MPa and a gas seal member that prevents high-pressure gas leakage by coming in contact with the high-pressure gas filled in the container. Specifically, examples of high-pressure gas equipment include high-pressure hydrogen equipment, and examples of such high-pressure hydrogen equipment include a hydrogen manufacturing apparatus, a hydrogen gas compressor, a gas accumulator, a fuel cell or the like, which are suitably used for a hydrogen station.

(Composition for Gas Seal Member)

The disclosed composition for a gas seal member is an elastomer composition that contains an elastomer and a fibrous carbon nanostructure, and optionally further contains an additive such as a crosslinking agent and an antioxidant. In the disclosed composition for a gas seal member, a fibrous carbon nanostructure including single-walled carbon nanotubes is used as a fibrous carbon nanostructure.

<Elastomer>

Examples of the elastomer of composition for a gas seal member may include, but not particularly limited to known elastomers used to form a gas seal member. Specifically, examples of elastomer include, for example, natural rubbers, butadiene rubbers, styrene-butadiene rubbers, isoprene rubbers, nitrile rubbers, hydrogenated nitrile rubbers, fluororubbers, chloroprene rubbers, ethylene propylene rubbers, halogenated butyl rubbers, polyisobutylene rubbers, silicone rubbers or the like. These may be used alone or in combination of two or more thereof.

Among the above described rubbers, rubbers having a Mooney viscosity ($ML_{1+4}$, 100° C.) of at least 20 and no greater than 150 (e.g. hydrogenated nitrile rubbers, nitrile rubbers, ethylene-propylene rubbers, silicone rubber, etc.) and fluororubbers having a Mooney viscosity ($ML_{1+10}$, 121° C.) of at least 20 and no greater than 150 are preferred as an elastomer. In the present disclosure, a Mooney viscosity may be measured in accordance with JIS K6300.

<Fibrous Carbon Nanostructure>

Examples of fibrous carbon nanostructure include, for example, a cylindrical carbon nanostructure such as carbon nanotubes (CNT) and a non-cylindrical carbon nanostructure such as carbon nanostructure or the like composed of a six-membered ring network of carbon formed in a flat cylindrical shape. In the disclosed composition for a gas seal member, a fibrous carbon nanostructure including single walled CNTs is used. In this manner, by using a fibrous carbon nanostructure including single walled CNTs, a gas seal member capable of sufficiently suppressing both the occurrence of overflow fracture and the occurrence of blister fracture can be formed.

Although it is not clear why the occurrence of overflow fracture and the occurrence of blister fracture can be suppressed by using the fibrous carbon nanostructure including single walled CNTs, the reason is presumed to be as follows: The single walled CNT is more permeable to gas than the multiwalled CNT. Thus a gas seal member using single walled CNTs allows the gas permeated into the gas seal member to come out smoothly therefrom at the time of rapid pressure reduction, and the occurrence of blister fracture can be suppressed. Further, a single walled CNT has a higher reinforcing effect than that of a multiwalled CNT. Thus, a gas seal member using single walled CNTs is less likely to be deformed when it comes in contact with high pressure gas, and it is presumed that a overflow fracture is less likely to occur.

The amount of the fibrous carbon nanostructure in the composition for a gas seal member is necessary to be at least 0.1 parts by mass, preferably at least 1 part by mass, more preferably at least 2 parts by mass, and still more preferably at least 3 parts by mass per 100 parts by mass of the elastomer. When the amount of the fibrous carbon nanostructure is less than 0.1 parts by mass per 100 parts by mass of the elastomer, the strength of a gas seal member formed by using a composition for a gas seal member cannot be secured, and the occurrence of overflow fracture and the occurrence of blister fracture cannot be sufficiently suppressed.

Further, the amount of the fibrous carbon nanostructure contained in the composition for a gas seal member is necessary to be no greater than 12 parts by mass, preferably no greater than 10 parts by mass, more preferably no greater than 8 parts by mass, and still more preferably no greater than 7 parts by mass per 100 parts by mass of the elastomer. When the amount of the fibrous carbon nanostructure is more than 12 parts by mass per 100 parts by mass of the elastomer, the gas permeated into the gas seal member formed by the component for gas seal member does not come out easily from the gas seal member, and thus the occurrence of blister fracture cannot be sufficiently suppressed.

The fibrous carbon nanostructure is not particularly limited as long as it includes single walled CNTs, and it may include only single walled CNTs, or may be a mixture of single walled CNTs and multiwalled CNTs. Further, it may be a mixture of CNTs including at least single walled CNTs and a fibrous carbon nanostructure other than the CNTs.

In terms of suppressing both the occurrence of overflow fracture and the occurrence of blister fracture in a gas seal member formed by using a composition for a gas seal member, the proportion of the single walled CNTs in 100 pieces of fibrous carbon nanostructure is preferably at least 50 pieces, more preferably at least 70 pieces, and still more preferably at least 90 pieces.

Further, preferably, the fibrous carbon nanostructure including single walled CNTs exhibits a convex upward shape in t-plot obtained from an adsorption isotherm. By using the fibrous carbon nanostructure exhibiting a convex upward shape in t-plot obtained from an adsorption isotherm, a gas seal member capable of further suppressing the occurrence of blister fracture can be formed.

Note that, more preferably, the fibrous carbon nanostructure including single walled CNTs is not subjected to an opening formation treatment of CNT and exhibits a convex upward shape in t-plot.

In general, adsorption is a phenomenon in which gas molecules are taken onto a solid surface from the gas phase and is categorized as physical adsorption or chemical adsorption depending on the main cause of adsorption. In the nitrogen gas adsorption method used to obtain a t-plot, the physical adsorption is used. In general, when the adsorption temperature is kept constant, the number of the nitrogen gas molecules adsorbed by the fibrous carbon nanostructure increases as the pressure increases. Further, a plot of the relative pressure (ratio of pressure at adsorption equilibrium P and saturated vapor pressure P0) on a horizontal axis and the amount of adsorbed nitrogen gas on a vertical axis is referred to as "isotherm." The isotherm is referred to as an "adsorption isotherm" in a situation in which the amount of adsorbed nitrogen gas is measured while increasing the pressure and is referred to as a "desorption isotherm" in a situation in which the amount of adsorbed nitrogen gas is measured while decreasing the pressure.

The t-plot is obtained from the adsorption isotherm measured by the nitrogen gas adsorption method by converting the relative pressure to an average thickness t (nm) of an adsorbed layer of nitrogen gas. Specifically, a t-plot for the fibrous carbon nanostructure can be obtained by calculating an average thickness t of the adsorbed layer of nitrogen gas corresponding to a given relative pressure from a known standard isotherm in which the average thickness t of the adsorbed layer of nitrogen gas is plotted against the relative pressure P/P0, and performing the above described conversion (t-plot method of de Boer et al.).

For a sample having pores on the surface thereof, the growth of the adsorbed layer of nitrogen gas is categorized into the following processes (1) to (3) shown below. The gradient of the t-plot changes in accordance with the processes (1) to (3).

(1) a process in which a single molecular adsorption layer is formed over the entire surface by nitrogen molecules;
(2) a process in which a multi-molecular adsorption layer is formed in accompaniment to capillary condensation filling of pores; and
(3) a process in which a multi-molecular adsorption layer is formed on a surface that appears to be non-porous due to the pores being filled by nitrogen.

Further, preferably, although the t-plot of the fibrous carbon nanostructure including single walled CNTs is on a straight line passing through the origin in a area in which the average thickness t of the adsorbed layer of nitrogen gas is small, as the average thickness t increases, the plot deviates downward from the straight line to form a convex upward shape. The shape of the t-plot described above indicates that the proportion of an internal specific surface area relative to a total specific surface area of the fibrous carbon nanostructure is large and that there are a large number of openings formed in the carbon nanostructure constituting the fibrous carbon nanostructure. As a result of formation of a large number of openings, it is presumed that the gas permeated into the fibrous carbon nanostructure is easy to pass through and exit (i.e. the gas seal member including the fibrous carbon nanostructure is less likely to cause a blister fracture).

Note that the t-plot of the fibrous carbon nanostructure including single walled CNTs preferably has a bending point in a range satisfying 0.2 t (nm) 1.5, more preferably in a range satisfying 0.45 t (nm) 1.5, and still more preferably in a range satisfying 0.55 t (nm) 1.0. When the bending point of the t-plot is positioned within the above described range, the property of the fibrous carbon nanostructure is further improved, and thus the occurrence of blister fracture can be further suppressed.

The "position of the bending point" is defined as an intersection point of an approximated straight line A for the process (1) and an approximated straight line B for the process (3).

Furthermore, in the fibrous carbon nanostructure including single walled CNTs, a ratio of the internal specific surface area S2 relative to the total specific surface area S1 (S2/S1) obtained from the t-plot is preferably at least 0.05, more preferably at least 0.06, and still more preferably at least 0.08, and preferably no greater than 0.30. When S2/S1 is at least 0.05 and no greater than 0.30, the property of the fibrous carbon nanostructure can be further improved, and thus the occurrence of blister fracture can be further suppressed.

Although no specific limitations are placed on the total specific surface area S1 and the internal specific surface area S2 of the fibrous carbon nanostructure including single walled CNTs, when considered individually, S1 is preferably at least 600 $m^2/g$ and no greater than 1400 $m^2/g$, and further preferably at least 800 $m^2/g$ and no greater than 1200 $m^2/g$. On the other hand, S2 is preferably at least 30 $m^2/g$ and no greater than 540 $m^2/g$.

The total specific surface area S1 and the internal specific surface area S2 of the fibrous carbon nanostructure including single walled CNTs can be obtained from the t-plot for the fibrous carbon nanostructure. Specifically, first, the total specific surface area S1 can be obtained from the gradient of the approximate straight line in process (1) and an external specific surface area S3 can be obtained from the gradient of the approximate straight line in process (3). Thereafter, the internal specific surface area S2 can be calculated by subtracting the external specific surface area S3 from the total specific surface area S1.

Note that, for the fibrous carbon nanostructure including single walled CNTs, the measurement of an adsorption isotherm, preparation of a t-plot and calculation of total specific surface area S1 and internal specific surface area S2 based on t-plot analysis can for example be performed by using a "BELSORP®-mini (BELSORP is a registered trademark in Japan, other countries, or both) which is commercially available measurement apparatus from Bel Japan Inc.

Further, for the fibrous carbon nanostructure including single walled CNTs, a ratio of diameter standard deviation (σ) multiplied by 3 and the average diameter (Av) (3σ/Av) is preferably greater than 0.20 and less than 0.60, more preferably greater than 0.25, and still more preferably greater than 0.40. When a fibrous carbon nanostructure including single walled CNTs having 3σ/Av of greater than 0.20 and less than 0.60 is used, a gas seal member capable of further suppressing the occurrence of overflow fracture and the occurrence of blister fracture can be formed.

The "average diameter (Av) of the fibrous carbon nanostructure" and the "diameter standard deviation (σ: sample standard deviation) of the fibrous carbon nanostructure" can each be calculated by measuring the diameter (external diameter) of randomly selected 100 pieces of fibrous carbon nanostructure using a transmission electron microscope. Further, the average diameter (Av) of the fibrous carbon nanostructure including single walled CNTs and the standard deviation (σ) may be adjusted by changing the production method and production conditions of the fibrous carbon nanostructure.

Moreover, in a Raman spectrum of the fibrous carbon nanostructure including single walled CNTs, a ratio of G band peak intensity and D band peak intensity (G/D ratio) is preferably at least 1 and no greater than 20. When the G/D ratio is at least 1 and no greater than 20, a gas seal member capable of further suppressing the occurrence of overflow fracture and the occurrence of blister fracture can be formed.

Further, the average diameter (Av) of the fibrous carbon nanostructure including single walled CNTs is preferably at least 2 nm, and more preferably at least 2.5, and preferably no greater than 10 nm, and more preferably no greater than 6 nm. When the average diameter (Av) of the fibrous carbon nanostructure is at least 2 nm, the gas permeated inside the fibrous carbon nanostructure is easy to pass therethrough and exit, and thus a gas seal member capable of further suppressing the occurrence of blister fracture can be formed. Further, when the average diameter (Av) of the fibrous carbon nanostructure is no greater than 10 nm, the strength of the gas seal member formed by using the composition for a gas seal member can be increased, and thus the occurrence of overflow fracture can be further suppressed.

Further, preferably, the average length of the fibrous carbon nanostructure including single walled CNTs at the time of synthesis is at least 100 The fibrous carbon nanostructure having a longer structure length at the time of synthesis is likely to be damaged such as by breaking, severing, or the like during dispersion. Therefore, preferably, the average length of the structure at the time of synthesis is no greater than 5,000 μm.

In addition, the aspect ratio (length/diameter) of the fibrous carbon nanostructure including single walled CNTs is preferably greater than 10. Note that the aspect ratio of the fibrous carbon nanostructure can be determined by measuring the diameter and the length of randomly selected 100 pieces of fibrous carbon nanostructure with a transmission electron microscope, and calculating the average value of the ratio of length and diameter (length/diameter).

Furthermore, the BET specific surface area of the fibrous carbon nanostructure including single walled CNTs is preferably at least 600 m$^2$/g, and more preferably at least 800 m$^2$/g, and is preferably no greater than 2,500 m$^2$/g, and more preferably no greater than 1,200 m$^2$/g. When the BET specific surface area of the fibrous carbon nanostructure including single walled CNTs is at least 600 m$^2$/g, the strength of the gas seal member formed by using the composition for a gas seal member can be increased, and thus the occurrence of overflow fracture can be further suppressed. Further, when the BET specific surface area of the fibrous carbon nanostructure including single walled CNTs is no greater than 2500 m$^2$/g, the amount of gas permeated inside the fibrous carbon nanostructure from its surface is reduced, and a gas seal member capable of further suppressing the occurrence of blister fracture can be formed.

The term "BET specific surface area" is used in the present disclosure to refer to a nitrogen adsorption specific surface area that is measured by the BET method.

According to a super-growth method described below, the fibrous carbon nanostructure including single walled CNTs is obtained as an aggregate that is aligned in a perpendicular direction (aligned aggregate) on a substrate having a catalyst layer for carbon nanotube growth on the surface thereof. The mass density of the fibrous carbon nanostructure as the aggregate is preferably at least 0.002 g/cm$^3$ and no greater than 0.2 g/cm$^3$. When the mass density is no greater than 0.2 g/cm$^3$, binding between fibrous carbon nanostructures is weakened, and thus the fibrous carbon nanostructures can be dispersed homogeneously in the elastomer. Moreover, a mass density of at least 0.002 g/cm$^3$ makes the fibrous carbon nanostructure easier to handle by improving the unity of the fibrous carbon nanostructure and preventing the fibrous carbon nanostructure from becoming unbound.

Moreover, the fibrous carbon nanostructure including single walled CNTs preferably includes micropores. In particular, the fibrous carbon nanostructure preferably has micropores each having a pore diameter of smaller than 2 nm. In terms of the amount of micropores present, the micropore volume as obtained through the method described below is preferably at least 0.4 mL/g, more preferably at least 0.43 mL/g, and still more preferably at least 0.45 mL/g, and normally has an upper limit on the order of 0.65 mL/g. When the fibrous carbon nanostructure including single walled CNTs has the above described micropores, the gas permeated into the fibrous carbon nanostructure easily pass therethrough and exit, and thus the occurrence of blister fracture can be further suppressed. Note that volume can for example be adjusted through appropriate alteration of a preparation method and preparation conditions of the fibrous carbon nanostructure.

The "micropore volume (Vp)" can be calculated by using Equation (I): $Vp=(V/22414) \times (M/\rho)$ by measuring a nitrogen adsorption isotherm of the fibrous carbon nanostructure including single walled CNTs at liquid nitrogen temperature (77K), with the amount of adsorbed nitrogen at a relative pressure P/P0 of 0.19 being defined as V, where P is a measured pressure at adsorption equilibrium and P0 is a saturated vapor pressure of liquid nitrogen at the time of measurement. Further, in Equation (I), M is a molecular weight of the adsorbate (nitrogen), which is 28.010, and ρ is a density of the adsorbate (nitrogen) at 77K, which is 0.808 g/cm$^3$. The micropore volume can for example be measured by using a BELSORP®-mini (BELSORP is a registered trademark in Japan, other countries, or both) from Bel Japan Inc.

The fibrous carbon nanostructure including a single walled CNTs having the properties described above can, for example, be efficiently produced by forming a catalyst layer on the surface of the substrate through a wet process based on a method (super-growth method; see WO2006/011655 A1) in which, in synthesis of CNTs through chemical vapor deposition (CVD) by supplying a feedstock compound and a carrier gas onto a substrate having a catalyst layer for carbon nanotube production on the surface thereof, catalytic activity of the catalyst layer is dramatically improved by providing a trace amount of an oxidant (catalyst activating material) in the system. Hereinafter, carbon nanotubes obtained by the super-growth method may be also referred to as "SGCNTs."

The fibrous carbon nanostructure including single walled CNTs produced by the super-growth method may be composed of only SGCNTs, or of SGCNTs and non-cylindrical carbon nanostructure. Specifically, the fibrous carbon nanostructure including single walled CNTs may include a single layer or multi-layer flat cylindrical carbon nanostructure having a tape-like portion in which inner-walls are close or adhered to each other over the entire length thereof (hereinafter referred to also as "graphene nano tape (GNT)").

The GNT is presumed to be a material in which a tape-like portion having inner-walls that are close or adhered to each other are formed over the entire length from the time of its synthesis and six-membered ring network of carbon is formed into a flat cylindrical shape. The fact that the CNT has a flat cylindrical shape and a tape-like portion in which inner-walls are close or adhered to each other is present in the GNT can be confirmed, for example, by observing a fullerene-inserted GNT obtained by sealing GNT and fullerene (C60) in a quarts glass tube and subjecting the tube to heating processing (fullerene insertion processing) under reduced pressure with a transmission electron microscope (TEM) to find that there is a portion (a tape-like portion) of GNT into which no fullerene is inserted.

With respect to GNT, "having a tape-like portion over the entire length" means that "having a tape-like portion continuously or intermittently over at least 60%, preferably over at least 80%, more preferably over 100% of the length (full length) in a longitudinal direction."

Note that the fibrous carbon nanostructure including GNT as a non-cylindrical carbon nanostructure can be obtained by forming a substrate having a catalyst layer on the surface thereof (hereinafter referred to also as "catalyst substrate") by the predetermined method when CNT is synthesized by using a substrate having a catalyst layer on the surface thereof by the super-growth method. Specifically, the fibrous carbon nanostructure including GNTs can be obtained as follows: a coating liquid A containing an aluminum compound is applied onto a substrate; the applied coating liquid A is dried to form an aluminum thin film (catalyst carrying layer) on the substrate; after that, a coating liquid B containing an iron compound is applied onto the aluminum thin film; the applied coating liquid B is dried at 50° C. or below to form an iron thin film (catalyst layer) on the aluminum thin film; and a resultant catalyst substrate is used to synthesize CNT by the super-growth method.

<Additives>

Examples of additives that can be optionally blended in the composition for a gas seal member may include, but not particularly limited to known additives such as crosslinking agent, crosslinking aid, antioxidant and reinforcing material.

Specifically, crosslinking agents are not particularly limited, and known crosslinking agent capable of crosslinking an elastomer contained in the composition for a gas seal member can be used. Specifically, for example, sulfur, peroxide-based crosslinking agent, triallyl isocyanurate or the like may be used as a crosslinking agent.

Further, crosslinking aids are not particularly limited, and zinc oxide or the like may be used.

Moreover, antioxidants are not particularly limited, and amine-based antioxidant, imidazole-based antioxidant or the like may be used.

Furthermore, reinforcing materials are not particularly limited, and carbon black and silica may be used.

These additives may be used alone or two or more of such additives may be used in combination. Any amount of additives may be blended as long as expression of the desired effects is ensured.

<Preparation of Composition for Gas Seal Member>

The composition for a gas seal member can be prepared by mixing or kneading, for example, an elastomer, a fibrous carbon nanostructure including single-walled carbon nanotubes and an additive, which is an optional component, at a desired blending ratio.

Specifically, the composition for a gas seal member is not particularly limited, and can be prepared by obtaining a mixture of an elastomer and a fibrous carbon nanostructure containing single-walled carbon nanotubes and thereafter kneading the resultant mixture and an additive, which is an optional component.

The mixture of an elastomer and a fibrous carbon nanostructure including single-walled carbon nanotubes can be prepared by using an optional mixing method in which a fibrous carbon nanostructure including single-walled carbon nanotubes can be dispersed in an elastomer. Specifically, the above described mixture is not particularly limited, and can be prepared as follows: a fibrous carbon nanostructure including single walled CNTs is added to an elastomer solution obtained by dissolving an elastomer in an organic solvent or an elastomer dispersion liquid obtained by dispersing an elastomer in a dispersion medium; then, the fibrous carbon nanostructure including CNTs is subjected to a dispersion processing by using a ultrasonic homogenizer, a wet jet mill or the like; and after that, an organic solvent or a dispersion medium is removed from the resultant liquid treated with dispersion.

Mixture and additive can be kneaded by using, for example, a mixer, a single-screw kneader, a twin-screw kneader, a roll, a Brabender, an extruder or the like.

(Gas Seal Member)

The disclosed gas seal member can be obtained by forming the above described composition for a gas seal member into a desired shape. Specifically, the gas seal member can be formed by putting the above described composition for a gas seal member into a mold and optionally by crosslinking the composition. The gas seal member formed by using the above described composition for a gas seal member contains a component derived from a component contained in the composition for a gas seal member at the same ratio as that contained in the component for gas seal member. In other words, for example, when the composition for a gas seal member contains a crosslinking agent, the gas seal member contains a crosslinked elastomer and a fibrous carbon nanostructure including single walled CNTs at a predetermined ratio, and the gas seal member further optionally contains an additive such as an antioxidant.

The gas seal member may be formed into any shape depending on the application. The gas seal member may, for example, be shaped into an annular gas seal member (O-ring) or a hollow disk-like gas seal member.

The above described gas seal member can then sufficiently suppress both the occurrence of overflow fracture and the occurrence of blister fracture.

When the gas seal member is a crosslinked product obtained by crosslinking the above described composition for a gas seal member, the crosslinked product may preferably have the following properties:

The tensile strength is preferably at least 8 MPa, more preferably at least 10 MPa, still more preferably at least 12 MPa, and particularly preferably at least 14 MPa, and preferably no greater than 60 MPa, more preferably no greater than 55 MPa, still more preferably no greater than 50 MPa and particularly preferably no greater than 45 MPa.

Further, the elongation at break is preferably at least 100%, more preferably at least 110%, still more preferably at least 120% and particularly preferably at least 130%, and preferably no greater than 600%, more preferably no greater than 550%, still more preferably no greater than 500% and particularly preferably no greater than 450%.

Furthermore, the durometer hardness is preferably at least 65, more preferably at least 70, still more preferably at least 73, and particularly preferably at least 75, and preferably no greater than 95, more preferably no greater than 93, still more preferably no greater than 92 and particularly preferably no greater than 90.

The "tensile strength" and "elongation at break" of the crosslinked product may be measured in accordance with JIS K6251. Further, the "durometer hardness" of the crosslinked product may be measured in accordance with JIS K6253 by using a Type A Durometer.

EXAMPLES

Hereinafter, the present disclosure will be specifically described with reference to Examples. However, the disclosure is not limited to the Examples. In the following, "%" and "parts" used in expressing quantities are by mass, unless otherwise specified.

In the Examples and Comparative Examples, the tensile strength, the elongation at break and the durometer hardness of a crosslinked product and the blister resistance and durability of a gas seal member were respectively measured or evaluated by using the following methods.

<Tensile Strength>

The produced sheet-like crosslinked product was punched with a No. 3 dumbbell to obtain a test specimen. The tensile strength of the obtained test specimen was then measured at 23° C. in accordance with JIS K 6251.

<Elongation at Break>

The produced sheet-like crosslinked product was punched with a No. 3 dumbbell to obtain a test specimen. The elongation at break of the obtained test specimen was then measured at 23° C. in accordance with JIS K 6251.

<Durometer Hardness>

The produced sheet-like crosslinked product was punched with a No. 3 dumbbell to obtain a test specimen. The durometer hardness of the obtained test specimen was then measured at 23° C. in accordance with JIS K 6253 by using a Type A Durometer.

<Blister Resistance>

The produced four O-rings were subjected to a test in which pressure increase and decrease were repeated (RGD (Rapid Gas Decompression) test) in accordance with ISO23936-2 to evaluate the blister resistance.

Specifically, each of the produced O-rings was placed in a mounting groove of the test apparatus. Note that the filling rate of each O-ring in the groove was defined as 85 volume % and the compressibility thereof was defined as 15 volume %.

Subsequently, the area of the inner periphery of each O-ring in the test apparatus was set to be an atmosphere of $CH_4/CO_2$ (mix ratio: $CH_4/CO_2$=90 mol %/10 mol %) at 100° C., and was held for 68 hours under a pressure of 15 MPa. Thereafter, the pressure of the area of the inner periphery of each O-ring was reduced at a rate of 2 MPa/min, until the atmospheric pressure was obtained, and each O-ring was left for one hour under the atmospheric pressure. Subsequently, as a pressure increase/decrease operation for the second time, the pressure was increased to 15 MPa. Each O-ring was then held for 6 hours under a pressure of 15 MPa. Thereafter, the pressure of the inner periphery of each O-ring was reduced at 2 MPa/min. to obtain the atmospheric pressure, and each O-ring was left for one hour under the atmospheric pressure. Thereafter, the same pressure increase/decrease operation as the second operation was repeated seven times in total.

Thereafter, each O-ring was taken out from the test apparatus and four parts of the O-ring was cut to evaluate the blister resistance in accordance with the criteria described below.

The above described pressure increase/decrease repetition test was performed to four O-rings, and when the score of evaluation for all of four O-rings was 3 or less, it was determined as "pass," and if any of the O-rings has the score of 4 or more, it was determined as "fail." Note that the O-ring with a lower score indicates that it has a higher blister resistance and is less likely to cause blister fracture.

Score 0: No crack, dent or swell

Score 1: Score 0 conditions are not satisfied, and conditions that the number of cracks is four or less, the length of each crack is less than the half of the diameter of O-ring and the total length of the cracks is less than or equal to the diameter of O-ring are satisfied.

Score 2: Score 0 and Score 1 conditions are not satisfied, and conditions that the number of cracks is six or less, the length of each crack is less than the half of the diameter of O-ring and the total length of cracks is 2.5 times or less the diameter of O-ring are satisfied.

Score 3: Score 0 to 2 conditions are not satisfied, and conditions that the number of cracks is nine or less and the number of cracks with a length of 50% or more and less than 80% of the diameter of O-ring is two or less are satisfied.

Sore 4: Score 0 to 3 conditions are not satisfied, and conditions that the number of cracks is eight or more and the number of cracks with a length of 80% or more of the diameter of O-ring is at least one are satisfied.

Score 5: Crack pierces through the O-ring section and the O-ring is split or broken into pieces.

<Durability>

First, the weight (Wa) of the produced cylindrical test specimen was measured.

Next, the cylindrical test specimen was placed in a mold having a distance between gaps of 0.635 mm, then was heated at 175° C. and pressurized at 103.5 MPa for 5 minutes, and after that, the temperature and the pressure were returned to the normal temperature and pressure. Subsequently, the weight (Wb) of the test specimen not protruded from the mold was measured.

The amount of deformation was determined by using the following formula. The Smaller the amount, the higher the durability, and overflow fracture is less likely to occur.

$$\text{Amount of deformation (mass \%)} = \{(Wa-Wb)/Wa\} \times 100$$

Example 1

<Preparation of Fibrous Carbon Nanostructure Including Single-Walled Carbon Nanotubes>

Carbon nanotubes (SGCNTs) as a fibrous carbon nanostructure were prepared by super-growth method in accordance with WO2006/011655 A1. When SGCNTs were prepared, a catalyst layer was formed on a substrate surface through a wet process, and feedstock gas containing acetylene as a main component was used.

The resultant SGCNTs were composed mainly of single-walled CNTs. In the measurement using a Raman spectrophotometer, a radial breathing mode (RBM) spectrum was observed in a low-wavenumber area from 100 to 300 $cm^{-1}$, which is characteristic of a single-walled CNT. Further, the BET specific surface area of SGCNT measured with the BET specific surface area meter (BELSORP® (registered trademark in Japan, other countries, or both, from Bel Japan Inc.) was 1050 $m^2/g$ (unopened). Moreover, the diameter and the length of 100 randomly selected SGCNTs were measured with a transmission electron microscope to determine the average diameter (Av), the standard deviation(σ) of the diameter and the average length of the SGCNTs, and the average diameter (Av) was 3.3 nm, the standard deviation (σ) multiplied by 3 (3σ) was 1.9 nm, the ratio (3σ/Av) was 0.58 and the average length was 500 Moreover, when the t-plot of the SGCNTs was measured with "BELSORP® (BELSORP (registered trademark in Japan, other countries, or both) from Bel Japan Inc., the t-plot exhibits a convex upward shape. The ratio of S2/S1 was 0.09 and the position t of the bending point was 0.6 nm.

<Preparation of Composition for Gas Seal Member>

[Preparation of Mixture]

190 g of hydrogenated nitrile rubbers (Zetpol® 2020L (Zeptol is a registered trademark in Japan, other countries, or both) from ZEON Corporation) as an elastomer was added to 9800 g of methyl ethyl ketone as an organic solvent, and the mixture was stirred for 48 hours to dissolve the hydrogenated nitrile rubbers. The Mooney viscosity ($ML_{1+4}$, 100° C.) of the hydrogenated nitrile rubbers measured in accordance with JIS K6300 was 57.5.

Subsequently, 19 g of SGCNTs were added to the resultant hydrogenated nitrile rubber solution and the mixture was stirred for 15 minutes with a stirrer (LABOLUTION® (LABOLUTION is a trademark in Japan, other countries, or both) from PRIMIX Corporation). Moreover, the solution obtained by adding SGCNTs was subjected to a dispersion treatment at 120 MPa with a wet jet mill (L-ES007 from Yoshida Kikai Co., Ltd.). Thereafter, the resultant liquid treated with dispersion was dropped onto 50,000 g of cyclohexane and coagulated to obtain a black solid substance. The obtained black solid substance was then dried at 50° C. for 48 hours under a reduced pressure to obtain a mixture of hydrogenated nitrile rubbers and SGCNTs.

[Kneading]

Subsequently, the mixture of hydrogenated nitrile rubbers and SGCNTs, 4,4'-Bis(a,a-dimethylbenzyl)diphenylamine (Product name "NOCRAC CD" from OUCHI SHINKO CHEMICAL INDUSTRIAL CO., LTD.) and zinc salt of 2-mercaptobenzimidazole (Product name "NOCRAC MBZ" from OUCHI SHINKO CHEMICAL INDUSTRIAL CO., LTD.) as antioxidant, and 1,3-bis(t-butylperoxyisopropyl)benzene (product name "Vul Cup 40KE" from GEO Specialty Chemicals Inc.) as a crosslinking agent were kneaded with a proportion shown in Table 1 to obtain a composition for a gas seal member.

<Preparation of Sheet-Like Crosslinked Product>

The resultant composition for a gas seal member was put into a mold and crosslinked at 170° C. and 10 MPa for 20 minutes to obtain a sheet-like crosslinked product (length: 150 mm, width: 150 mm, thickness 2 mm).

The resultant sheet-like crosslinked product was used to measure the tensile strength, the elongation at break and the durometer hardness of a crosslinked product. The results are shown in Table 1.

<Production of O-ring>

The resultant composition for a gas seal member was put into a mold and crosslinked at 170° C. and 10 MPa for 20 minutes to produce an O-ring (gas seal member).

The resultant O-ring was then used to evaluate the blister resistance. The results are shown in Table 1.

<Production of Cylindrical Test Specimen>

The resultant composition for a gas seal member was put into a mold and crosslinked at 170° C. and 10 MPa for 25 minutes to produce a cylindrical test specimen having a diameter of 29 mm and a height of 12.7 mm.

The resultant cylindrical test specimen was then used to evaluate the durability. The results are shown in Table 1.

Examples 2 and 3

A composition for a gas seal member, a sheet-like crosslinked product, an O-ring and a cylindrical test specimen were produced in the same way as Example 1 except that the amount of SGCNTs added to the hydrogenated nitrile rubber solution when preparing a mixture was changed to 9.5 g (Example 2) and 1.9 g (Example 3). The evaluation was then performed in the same manner as Example 1. The results are shown in Table 1.

Example 4

A composition for a gas seal member was obtained in the same manner as Example 1 except that, when a mixture was prepared, as an elastomer, 190 g of fluororubber (Viton GBL200S from Du Pont) was used instead of 190 g of hydrogenated nitrile rubbers, the adding amount of SGCNTs was changed to 9.5 g, 50,000 g of methanol was used instead of 50,000 g of cyclohexane, and when kneading, a mixture of fluororubber and SGCNTs, zinc oxide as a crosslinking aid, 2,5-dimetyl-2,5-di(t-butylperoxy)hexane (product name "Perhexa 25B40" from Nippon Yushi Co., Ltd.) as a crosslinking agent and Triallyl isocyanurate (product name "TAIC(™)," TAIC is a trademark of Nippon Kasei Chemical Co., Ltd.) as a co-crosslinking agent were kneaded in a proportion shown in Table 1.

Subsequently, the resultant composition for a gas seal member was put into a mold and crosslinked at 170° C. and 10 MPa for 20 minutes to obtain a sheet-like primary crosslinked product (length: 150 mm, width: 150 mm, thickness: 2 mm). Next, the resultant sheet-like primary crosslinked product was subjected to a secondary crosslinking in a Geer oven at 230° C. for 2 hours to produce a sheet-like crosslinked product.

Further, the resultant composition for a gas seal member was put into a mold and crosslinked at 170° C. and 10 MPa for 20 minutes, and subsequently, the resultant primary crosslinked product was subjected to a secondary crosslinking in a Geer oven at 230° C. for 2 hours to produce an O-ring (gas seal member).

Moreover, the resultant composition for a gas seal member was put into a mold and crosslinked at 170° C. and 10 MPa for 25 minutes to obtain a cylindrical primary crosslinked product having a diameter of 29 mm and a height of 12.7 mm. Subsequently, the resultant cylindrical primary crosslinked product was subjected to a secondary crosslinking in a Geer oven at 230° C. for 2 hours to produce a cylindrical test specimen.

Evaluation was then performed in the same manner as Example 1. The results are shown in Table 1.

The Mooney viscosity ($ML_{1+10}$, 121° C.) of the fluororubber measured in accordance with JIS K6300 was 25.

Comparative Examples 1 and 2

A composition for a gas seal member, a seat-like crosslinked product, an O-ring and a cylindrical test specimen were produced in the same manner as Example 1 except that, when a mixture was prepared, the amount of SGCNTs added to the hydrogenated nitrile rubber solution was changed to 0.1 g (Comparative Example 1) and 38 g (Comparative Example 2). The evaluation was then performed in the same manner as Example 1. The results are shown in Table 1.

Comparative Example 3

A Sheet-like crosslinked product, an O-ring and a cylindrical test specimen were manufactured in the same manner as Example 1 except that the composition for a gas seal member prepared as follows was used. The evaluation was then performed in the same manner as Example 1. The results are shown in Table 1.

<Preparation of Composition for Gas Seal Member>

150 g of hydrogenated nitrile rubbers (Zetpol 2020L from ZEON Corporation) as an elastomer was masticated using an open roll at a surface temperature of 20° C., and subsequently, multi-layer CNT (product name "NC7000" from Nanocyl SA, BET specific surface area: 290 $m^2/g$) as a fibrous carbon nanostructure not including single walled CNTs, 4,4'-Bis(a,a-dimethylbenzyl)diphenylamine (Product name "NOCRAC CD" from OUCHI SHINKO CHEMICAL INDUSTRIAL CO., LTD.) and zinc salt of 2-mercaptobenzimidazole(Product name "NOCRAC MBZ" from OUCHI SHINKO CHEMICAL INDUSTRIAL CO., LTD.) as antioxidant, and 1,3-bis (t-butylperoxyisopropyl)benzene (product name "Vul Cup 40KE" from GEO Specialty Chemicals Inc.) as a crosslinking agent were kneaded in a proportion shown in Table 1. Subsequently, the roll gap was set to 0.5 mm and tight milling was performed 10 times to obtain a composition for a gas seal member.

Comparative Example 4

A sheet-like crosslinked product, an O-ring and a cylindrical test specimen were produced in the same manner as Example 1 except that the composition for a gas seal member prepared as follows was used. The evaluation was then performed in the same manner as Example 1. The results are shown in Table 1.

<Composition for Gas Seal Member>

150 g of hydrogenated nitrile rubbers (Zetpol 2020L from ZEON Corporation) was masticated using a 250 ml Banbury mixer, and carbon black (product name "SEAST SO" from TOKAI CARBON Co., Ltd, BET specific surface area: 42 $m^2/g$) and 4,4'-Bis(a,a-dimethylbenzyl)diphenylamine (Product name "NOCRAC CD" from OUCHI SHINKO CHEMICAL INDUSTRIAL CO., LTD.) and zinc salt of 2-mercaptobenzimidazole (Product name "NOCRAC MBZ" from OUCHI SHINKO CHEMICAL INDUSTRIAL CO., LTD.) as antioxidant were added in a proportion shown in Table 1, and the resultant mixture was mixed at 80° C. as a starting temperature for 3.5 minutes. The resultant mixture was transferred to a roll and 1,3-bis (t-butylperoxyisopropyl) benzene (product name "Vul Cup 40KE" from GEO Specialty Chemicals Inc.) as a crosslinking agent was added in a proportion shown in FIG. 1, and the mixture was kneaded at 50° C. to obtain a composition for a gas seal member.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Composition for gas seal member | Elastomer | Hydrogenated nitrile rubber [parts by mass] | 100 | 100 | 100 | — | 100 | 100 | 100 | 100 |
| | | Fluororubber [parts by mass] | — | — | — | 100 | — | — | — | — |
| | Fibrous carbon nanostructure | SGCNT [parts by mass] | 10 | 5 | 1 | 5 | <0.1 | 20 | — | — |
| | | NC7000 [parts by mass] | — | — | — | — | — | — | 10 | — |
| | Carbon black | SEASTO SO [parts by mass] | — | — | — | — | — | — | — | 10 |
| | Crosslinking agent | Vul Cup 40KE [parts by mass] | 8 | 8 | 8 | — | 8 | 8 | 8 | 8 |
| | | Zinc oxide [parts by mass] | — | — | — | 3 | — | — | — | — |
| | Crosslinking aid | Perhexa 25B40 [parts by mass] | — | — | — | 2 | — | — | — | — |
| | | TAIC [parts by mass] | — | — | — | 3 | — | — | — | — |
| | Antioxidant | NOCRAC CD [parts by mass] | 1.5 | 1.5 | 1.5 | — | 1.5 | 1.5 | 1.5 | 1.5 |
| | | NOCRAC MBZ [parts by mass] | 1.5 | 1.5 | 1.5 | — | 1.5 | 1.5 | 1.5 | 1.5 |
| Evaluation results | | Tensile strength [MPa] | 30.6 | 17.1 | 10.2 | 28.5 | 6.2 | 42.9 | 26.7 | 8.8 |
| | | Elongation at break [%] | 120 | 170 | 200 | 112 | 320 | 70 | 134 | 270 |
| | | Durometer hardness [—] | 88 | 81 | 70 | 85 | 57 | 96 | 87 | 59 |
| | Blister resistance | Determination result | Pass | Pass | Pass | Pass | Fail | Fail | Fail | Fail |
| | | Score | 3, 3, 2, 1 | 3, 3, 0, 0 | 3, 3, 3, 3 | 3, 3, 3, 1 | 5, 5, 4, 4 | 5, 4, 4, 3 | 4, 3, 3, 2 | 5, 4, 4, 4 |
| | | Durability (amount of deformation) [Mass %] | 1.5 | 3.3 | 4.8 | 5.1 | 100 | 0.7 | 11.6 | 100 |

It can be seen from Table 1 that, in Examples 1 to 4 in which a fibrous carbon nanostructure including single-walled carbon nanotubes is blended at a given ratio, a gas seal member having an excellent blister resistance and durability can be obtained when comparing with Comparative Examples 1 and 2 in which a fibrous carbon nanostructure including single-walled carbon nanotubes was not blended at a given ratio and Comparative Examples 3 and 4 in which a fibrous carbon nanostructure including single-walled carbon nanotubes was not used.

In particular, it can be seen from Examples 1 to 3 of Table 1 that the blister resistance and durability of the gas seal member can be further improved by adjusting the blending amount of the fibrous carbon nanostructure including single-walled carbon nanotubes.

INDUSTRIAL APPLICABILITY

According to the present disclosure, a composition for a gas seal member that can forming a gas seal member capable of suppressing both the occurrence of overflow fracture and the occurrence of blister fracture can be provided.

Further, according to the present disclosure, a gas seal member capable of sufficiently suppressing both the occurrence of overflow fracture and the occurrence of blister fracture can be provided.

The invention claimed is:

1. A composition for a gas seal member containing an elastomer and a fibrous carbon nanostructure, wherein
    the fibrous carbon nanostructure includes single-walled carbon nanotubes, and the fibrous carbon nanostructure is included in a proportion of at least 0.1 parts by mass and no greater than 12 parts by mass per 100 parts by mass of the elastomer,
    the fibrous carbon nanostructure including single-walled carbon nanotubes have not undergone an opening formation treatment of carbon nanotubes and exhibits a convex upward shape in a t-plot obtained from an adsorption isotherm, and
    each carbon nanotube has an open end and a closed end.

2. The composition for a gas seal member according to claim 1, wherein a bending point of the t-plot is in a range of $0.2 \leq t\ (nm) \leq 1.5$.

3. The composition for a gas seal member according to claim 1, wherein a total specific surface area S1 and an internal specific surface area S2 obtained from the t-plot satisfy $0.05 \leq S2/S1 \leq 0.30$.

4. The composition for a gas seal member according to claim 1, wherein an average diameter of the fibrous carbon nanostructure is at least 2 nm and no greater than 10 nm.

5. The composition for a gas seal member according to claim 1, further comprising a crosslinking agent.

6. A gas seal member formed by using the composition for a gas seal member according to claim 1.

7. The gas seal member according to claim 6 used while being in contact with a high pressure gas of at least 10 MPa.

8. High pressure gas equipment, comprising:
    a container filled with a high pressure gas of at least 10 MPa; and
    a gas seal member according to claim 6 being in contact with the high pressure gas filled in the container.

* * * * *